(12) United States Patent
Swennen

(10) Patent No.: US 7,173,069 B2
(45) Date of Patent: Feb. 6, 2007

(54) POLYOLEFIN FOAMS AND METHODS OF MAKING THE SAME

(75) Inventor: Leon Swennen, Bilzen (BE)

(73) Assignee: Pregis Innovative Packaging Inc., Deerfield, IL (US)

( * ) Notice: Subject to any disclaimer, the term of this patent is extended or adjusted under 35 U.S.C. 154(b) by 80 days.

(21) Appl. No.: 10/728,062

(22) Filed: Dec. 4, 2003

(65) Prior Publication Data

US 2004/0138320 A1 Jul. 15, 2004

(30) Foreign Application Priority Data

Dec. 6, 2002 (GB) .................................. 0228476

(51) Int. Cl.
*C08J 9/00* (2006.01)
*C08L 23/06* (2006.01)

(52) U.S. Cl. .......................... 521/134; 521/79; 521/81; 521/143; 525/240

(58) Field of Classification Search ................. 521/79, 521/81, 134, 143; 525/420
See application file for complete search history.

(56) References Cited

U.S. PATENT DOCUMENTS

| | | | |
|---|---|---|---|
| 3,644,230 A | 2/1972 | Cronin | |
| 3,812,062 A | 5/1974 | Tatzel et al. | |
| 4,217,319 A | 8/1980 | Komori | |
| 4,289,857 A | 9/1981 | Hoki et al. | |
| 4,331,779 A | 5/1982 | Park | |
| 4,343,913 A | 8/1982 | Watanabe et al. | |
| 4,345,041 A | 8/1982 | Hoki et al. | |
| 4,359,539 A | 11/1982 | Hoki et al. | |
| 4,369,257 A | 1/1983 | Hoki et al. | |
| 4,528,300 A | 7/1985 | Park | |
| 4,644,013 A | 2/1987 | Fujie et al. | |
| 4,657,811 A | 4/1987 | Boyd et al. | |
| 4,661,401 A | 4/1987 | Akao | |
| 4,663,361 A | 5/1987 | Park | |
| 4,694,025 A | 9/1987 | Park | |
| 4,694,026 A | 9/1987 | Park | |
| 4,714,716 A | 12/1987 | Park | |
| 4,738,810 A | 4/1988 | Cheng-Shiang | |
| 4,868,025 A | 9/1989 | Strzelewicz | |
| 4,948,817 A | 8/1990 | Kuwabara et al. | |
| 5,000,992 A | 3/1991 | Kelch | |
| 5,030,662 A | 7/1991 | Banerjie | |
| 5,053,435 A | 10/1991 | Kuwabara et al. | |
| 5,059,376 A | 10/1991 | Pontiff et al. | |
| 5,089,533 A | 2/1992 | Park | |
| 5,128,212 A | 7/1992 | Kneale et al. | |
| 5,340,840 A | 8/1994 | Park et al. | |
| 5,348,984 A | 9/1994 | Lee | |
| 5,369,136 A | 11/1994 | Park et al. | |
| 5,387,620 A | 2/1995 | Park et al. | |
| 5,462,974 A | 10/1995 | Lee | |
| 5,667,928 A | 9/1997 | Thomas et al. | |
| 5,736,258 A | 4/1998 | Moy | |
| 5,876,813 A | 3/1999 | Bambara et al. | |
| 6,096,793 A | 8/2000 | Lee et al. | |
| 6,114,025 A | 9/2000 | DeVaudreuil et al. | |

FOREIGN PATENT DOCUMENTS

| JP | 64-022937 | * | 1/1989 |
|---|---|---|---|
| WO | 86/00628 | | 1/1986 |
| WO | 97/07907 | | 3/1997 |

OTHER PUBLICATIONS

Kirk-Otmer Encyclopedia of Chemical Technology, Online article "Ziegler-Natta Catalysts", 10 pages, 1999-2005 copyright.*
Kirk-Otmer Encyclopedia of Chemical Technology, Online article "Polyethylene, Linear Low Density" 11 pages, 1999-2005 copyright.*
Kirk-Otmer Encyclopedia of Chemical Technology, Online article "Polymers", 10 pages, 1999-2005 copyright.*
"Blending LLDPE Made Using Advanced Sclairtech Technology With Novapol © LDPE To Improve Tear And Impact Properties In Thin Foam Sheet"; Foams 2000, International Conference On Thermoplastic Foam; pp. 108-116 (Oct. 2000).
WPI Abstract AN 1992-126239 [30] & JP 4059840 (Tonen).
WPI Abstract AN 1989-321381 [34] & JP 1240540 (JSP Corp.).
Search Report for Application No. GB 0228476.8 (date of search May 30, 2003).

* cited by examiner

Primary Examiner—Irina S. Zemel
(74) Attorney, Agent, or Firm—Winston & Strawn LLP

(57) ABSTRACT

A non-crosslinked polyolefin foam comprises a plastics component and a blowing agent. The plastics component comprises a first constituent and a second constituent. The first constituent is a Ziegler-Natta catalyzed linear low density polyolefin and the second constituent is a low density polyolefin in one embodiment. The Ziegler-Natta catalyzed linear low density polyolefin has a polydispersity of less than 10 and a melt flow index less than 10 g/10 minutes. The second constituent may be a polypropylene.

66 Claims, 4 Drawing Sheets

POLYOLEFIN FOAMS AND METHODS OF MAKING THE SAME

CROSS-REFERENCE TO RELATED APPLICATION

This application claims the benefit of UK Patent Application No. 0228476.8 entitled "Improvements Relating to Foam Materials" filed on Dec. 6, 2002.

FIELD OF THE INVENTION

This invention is concerned with improvements relating to foam materials, including low density polyolefin foam materials, of the kind that may be utilized as packaging and/or cushioning materials. More particularly, the invention is directed to manufacturing closed-cell plastics foam.

BACKGROUND OF THE INVENTION

A closed-cell plastics foam is hereinafter defined as one in which the majority of the cells are closed. Typically, a closed-cell foam of a reasonable quality has at least 70% closed cells, and a closed-cell foam of a good quality has at least 85% closed cells, although this may be less in thin sheets (e.g., 1 mm or less).

A conventional starting material used in manufacturing low density polyolefin foam is a polyolefin resin such as a highly-branched low density polyethylene (LDPE), typically manufactured by a high-pressure radical polymerization process, such as, for example, tubular autoclave. In this process, the monomers are mixed thoroughly under high pressure and at a high heat that induces polymerization, and forms a polyethylene resin.

To produce a foam, this polyethylene resin, typically in pelletized form, is then plasticized in a screw extruder, and mixed with a blowing agent. When the material is extruded into, for example, a sheet form, the blowing agent expands, which produces a large number of small bubbles.

Where the polyethylene foam is used as a packaging material, while some physical strength characteristics are important, cost is very important, and over many years, much effort has been put into reducing cost.

To date, a majority of the effect in reducing the cost has been directed towards lowering the foam density and, by conventional techniques, it is possible to produce a material having a density as low as 15 to 20 kg/m$^3$.

Alternative materials have been considered in an attempt to further reduce the cost. In particular, a number of attempts have been made to use a linear low density polyolefin such as a linear low density polyethylene (LLDPE). LLDPE is typically manufactured at a lower pressure and a lower heat, using catalysts. At this time, LLDPE is approximately 10% less expensive than LDPEs.

However, conventional Ziegler-Natta LLDPE, hereinafter defined as LLDPE manufactured without using a metallocene (or a similar substance) as a catalyst, contains predominantly linear polymer chains with irregular short-chain branching and no substantial long-chain branching. Conventional Ziegler-Natta LLDPE has a narrow molecular weight distribution (MWD), which results in the material having poor foaming characteristics, specifically having a lower melt strength.

LLDPE may be produced by using different catalyst systems, (e.g., a metallocene catalyst), which can lead to producing polymers having substantial long-chain side branching. This long-chain side branching results in a material having a broad MWD and a higher melt strength. This method consequently has a higher cost. Such LLDPE may be blended with LDPE to produce a material that may be foamed to the required low density. Metallocene catalyzation, however, is an expensive process, and the cost of such modified LLDPE results in a material that is in fact more expensive than LDPE itself.

Alternatively, it is possible to add cross-linking agents such as organic peroxides to the LLDPE/LDPE mix, which again increase the extent of long-chain branching and the melt strength of the mix. However, these additional compounds are also expensive.

Attempts have been made to produce a foam from a blend of small quantities of conventional Ziegler-Natta LLDPE with LDPE, but it has been found that the melt strength of the blend is increased and so difficulty is encountered in achieving as low of density as is obtained using 100% LDPE, again resulting in a higher cost outweighing the savings resulting from using LLDPE.

Thus, it would be desirable to have a foam that overcomes at least some of the above-noted shortcomings of existing LDPE foam blends.

SUMMARY OF THE INVENTION

Surprisingly, it has been found by the present applicant that, when LLDPE is blended in higher amounts with LDPE, a material is produced that may be foamed to a low density foam product. Such a low density foam product does not increase in density compared with the product obtained using 100% LDPE. Additionally, it has been found by the present applicant that, when the foaming process is slightly modified, it is possible to produce a material that has good foaming characteristics and a low density, even when blending small amounts of LLDPE with LDPE. In this manner, small but significant savings may be obtained in manufacturing polyethylene foam.

Additionally, by using LLDPE, an increase in the toughness and elasticity of the foam is obtained, providing a higher degree of protection during, for example, transportation of the article.

According to a first aspect of the invention, there is provided a polyolefin foam comprising a plastics components and a blowing agent. The plastics component consisting primarily only of a first constituent and a second constituent, wherein the first constituent is a Ziegler-Natta catalyzed linear low density polyolefin and the second constituent is a low density polyolefin. Preferably, the second constituent is a low density polyethylene.

According to a second aspect of the invention, there is provided a polyolefin foam comprising a plastics component and a blowing agent. The plastics component consists primarily only of a first constituent and a second constituent, wherein the first constituent is a Ziegler-Natta catalyzed linear low density polyethylene and the second constituent is a polypropylene. Preferably, the second constituent is a high-melt strength polypropylene. The plastics component consists primarily of the mixtures specified above. This means that although other substances may be present in trace amounts, such trace substances are not thought to effect the foamability of the plastics component.

Additionally, nucleating agents and aging modifiers may be incorporated in a conventional manner.

The plastics component may consist primarily of from 1% to 85% by weight of the first constituent, and from 99% to 15% by weight of the second constituent.

Alternatively, the plastics component may consist primarily of from 5% to 10% by weight of the first constituent, and from 95% to 90% by weight of the second constituent. Alternatively, the plastics component may consist primarily of from 10% to 15% by weight of the first constituent, and from 90% to 85% by weight of the second constituent.

Alternatively, the plastics component may consist primarily of from 15% to 20% by weight of the first constituent, and from 85% to 80% by weight of the second constituent. Alternatively, the plastics component may consist primarily of from 20% to 25% by weight of the first constituent, and from 80% to 75% by weight of the second constituent.

Alternatively, the plastics component may consist primarily of from 25% to 30% by weight of the first constituent, and from 75% to 70% by weight of the second constituent. Alternatively, the plastics component may consist primarily of from 30% to 35% by weight of the first constituent, and from 70% to 65% by weight of the second constituent. Alternatively, the plastics component may consist primarily of from 35% to 40% by weight of the first constituent, and from 65% to 60% by weight of the second constituent.

The foam may have a density of less than 90 kg/m$^3$, conveniently less than 50 kg/m$^3$, preferably having a density of less than 30 kg/m$^3$, and most preferably having a density of less than 20 kg/m$^3$.

Preferably, the second constituent consists primarily of a polyethylene. Alternatively, the second constituent may consist primarily of a polypropylene, preferably a high-melt strength polypropylene.

According to a third aspect of the invention, there is provided a method of manufacturing a polyolefin foam. The method involves mixing as resin constituents primarily only a first constituent and a second constituent in an extruder, adding a blowing agent to the resultant mixture, and extruding the resultant mix into foam form. The first constituent is a Ziegler-Natta catalyzed linear low density polyolefin and the second constituent is a low density polyolefin. Preferably, the second constituent is a low density polyethylene.

According to a fourth aspect of the invention, there is provided a method of manufacturing a polyolefin foam. The method involves mixing as resin constituents primarily only a first constituent and a second constituent in an extruder, adding a blowing agent to the resultant mixture, and extruding the resultant mix into foam form. The first constituent is a LLDPE and the second constituent is a polypropylene. Preferably, the second constituent is a high-melt strength polypropylene.

The first constituent may be present in an amount from 1% to 85% by weight of the total polyolefin content.

Alternatively, the first constituent may be present in an amount from 5% to 10% by weight of the total polyolefin content. Alternatively, the first constituent may be present in an amount from 10% to 15% by weight of the total polyolefin content.

Alternatively, the first constituent may be present in an amount from 15% to 20% by weight of the total polyolefin content. Alternatively, the first constituent may be present in an amount from 20% to 25% by weight of the total polyolefin content.

Alternatively, the first constituent is present in an amount from 25% to 30% by weight of the total polyolefin content. Alternatively, the first constituent may be present in an amount from 30% to 35% by weight of the total polyolefin content. Alternatively, the first constituent is present in an amount from 35% to 40% by weight of the total polyolefin content.

Preferably, the polyolefin foam is a closed-cell polyolefin foam.

Using the methods discussed above, the foam may be extruded to a density of less than 90 kg/m$^3$, conveniently less than 50 kg/m$^3$, preferably being extruded to a density of less than 30 kg/m$^3$, and most preferably being extruded to a density of less than 20 kg/m$^3$.

Preferably, the second constituent consists primarily of a polyethylene. Alternatively, the second constituent may consist primarily of a polypropylene, preferably a high-melt strength polypropylene.

Preferably, in carrying out the method, the first constituent has a density of from 900 to 950 kg/m$^3$, and preferably from 917 to 930 kg/m$^3$.

Preferably, also the difference in the crystallization temperatures of the two resinous constituents of the foam is greater than 8° C., preferably greater than 10° C., and preferably greater than about 12° C.

Preferably, the first constituent has a melt flow index (according to ISO 1133) of less than 10 g/10 minutes, conveniently less than 5 g/10 minutes, and preferably less than 3 g/10 minutes. Preferably, the first constituent has a polydispersity of less than 10, conveniently less than 8, and typically less than 5.

The method may involve incorporating nucleating agents and aging agents.

Preferably, the methods discussed above involve using a twin-screw extruder. In this manner, an extrudable mixture may be obtained with lower levels of shear force than would be involved by using a single-screw extruder, allowing effective mixing to be obtained at a lower temperature than would otherwise be the case.

Preferably, the method involves controlling the melt temperature of the resin constituents. This may involve ensuring that the melt temperature is compared, preferably matched, to a pre-determined datum, and in this case, the datum is preferably derived from the melt temperature resulting when 100% of the second constituent is used.

By using the first constituent, an increase in the toughness and elasticity of the foam is obtained, providing a higher degree of protection during, for example, transportation of the article.

BRIEF DESCRIPTION OF THE DRAWINGS

Embodiments of this invention will now be described, by way of example only, with reference to the accompanying drawings in which.

Figure 1:
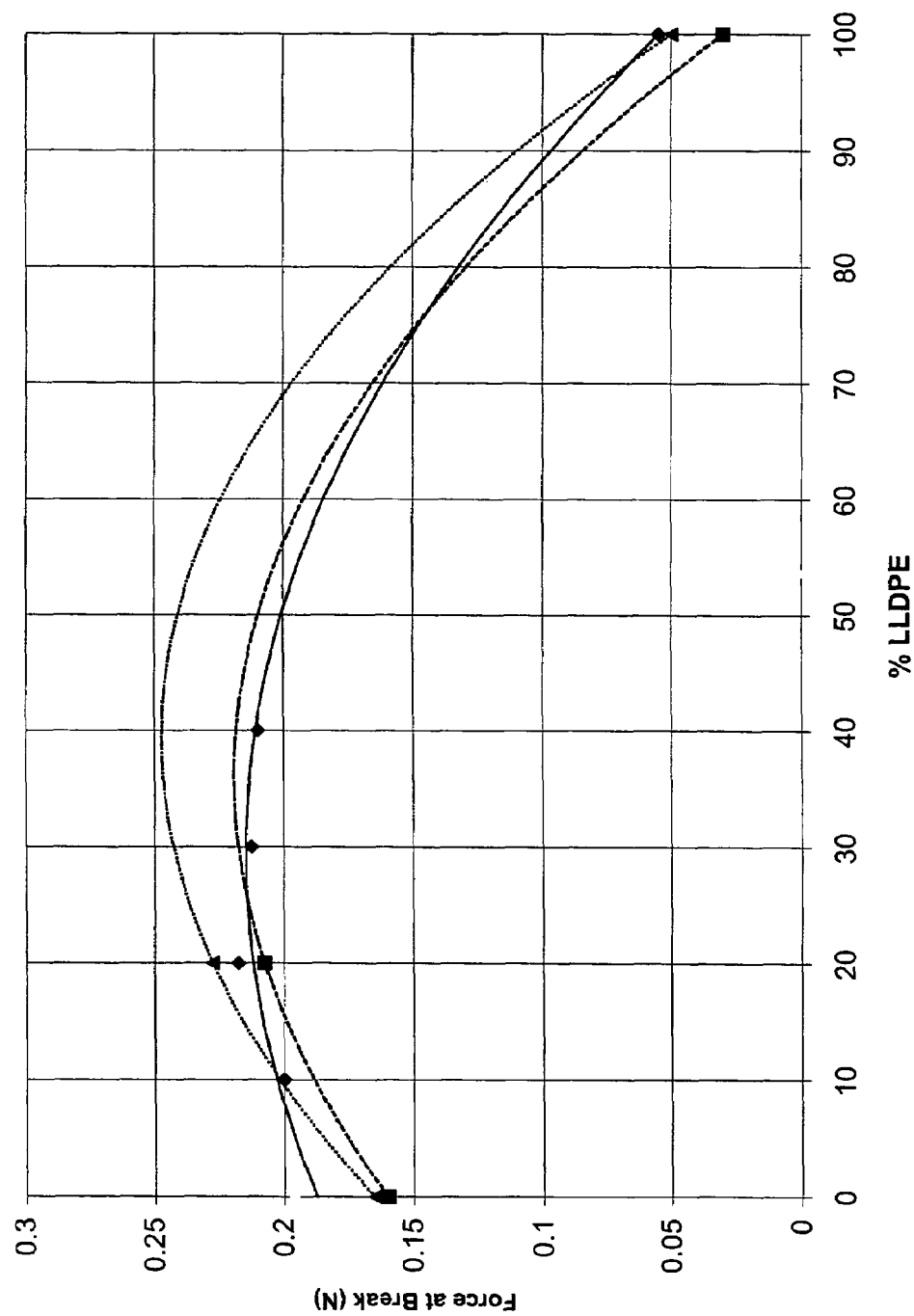
FIG. 1 is a graph that shows schematically the variation in force at break for different percentage blends of LDPE and LLDPE resin, and three different material blends.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DETAILED DESCRIPTION OF THE PREFERRED EMBODIMENTS/EXAMPLES

Figure 2:
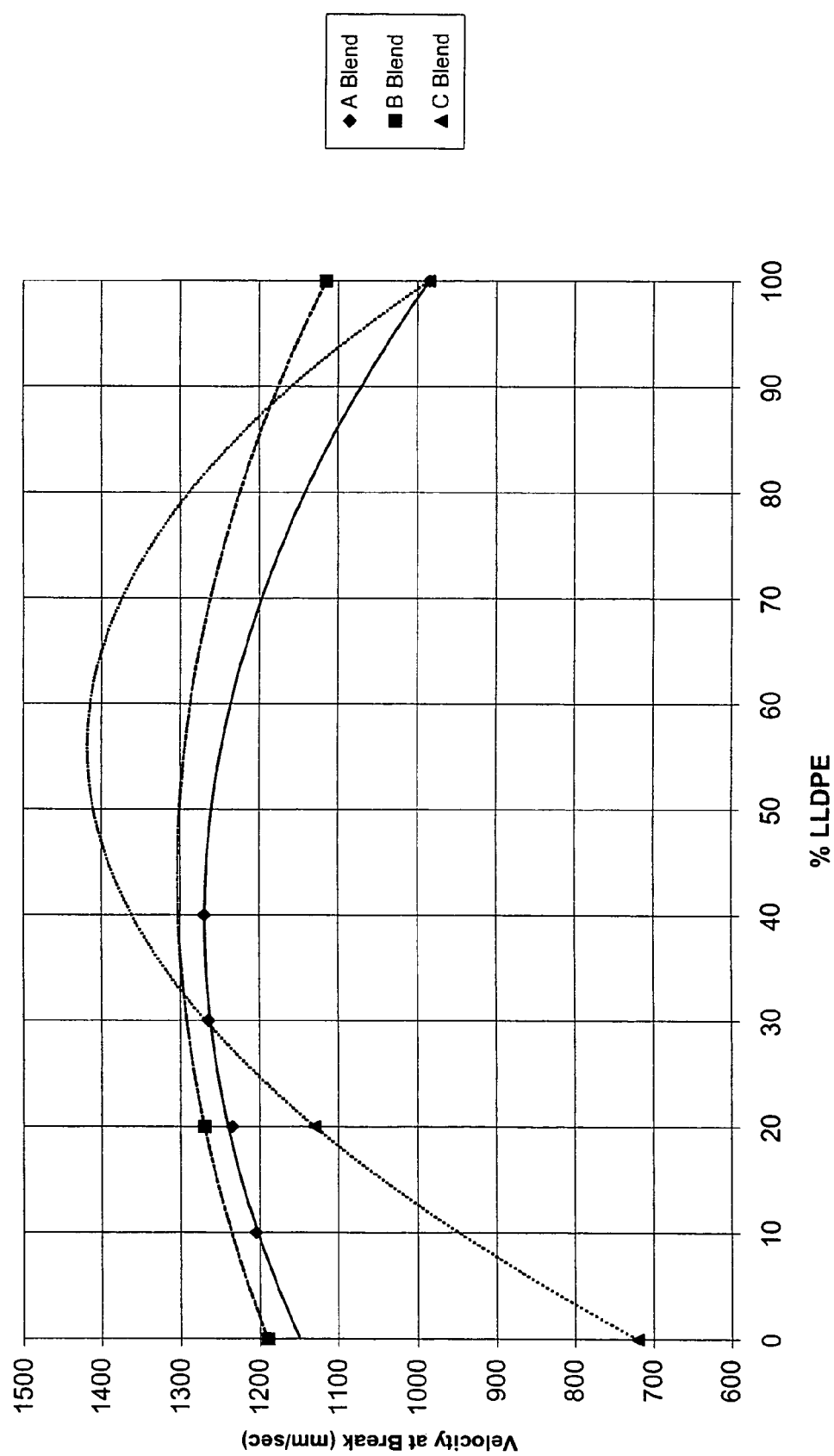
FIG. 2 is a graph that shows schematically the variation in velocity at break for different percentage blends of LDPE and LLDPE resin, and for three different material blends.
Figure 3:
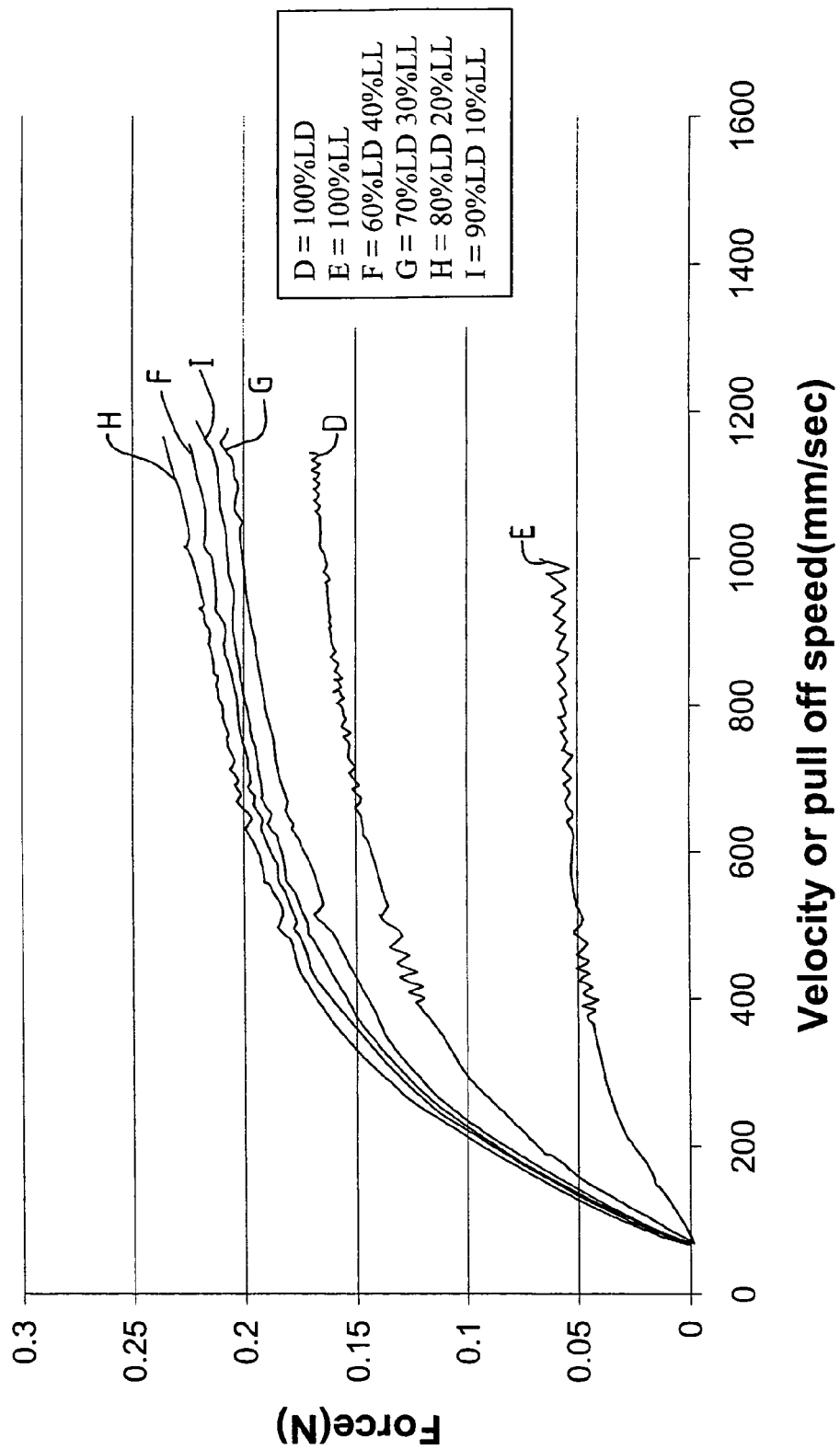
FIG. 3 is a graph that shows schematically the variation in force generated at different pull-off speeds for different percentage blends of LLDPE and LDPE resin.

Initial experiments were conducted on blends of LDPE and LLDPE resin. FIGS. 1 to 3 show examples of the results of these initial experiments. The LDPE was produced by the high-pressure radical-polymerization process. Alternatively, it is contemplated that LDPE may be produced by other processes. The LLDPE used was conventional low-pressure Ziegler-Natta catalyzed LLDPE without using metallocenes or similar substances as a catalyst. The particular LLDPE used in these examples was produced with a $C_4$ co-monomer. It is believed that the results would be equally applicable to LLDPEs produced from other co-monomers, such as $C_6$ or $C_8$ co-monomers.

The blends consist primarily only of LDPE and LLDPE. This means that although other substances may be present in trace amounts, such trace substances are not believed to affect the characteristics of the blends shown in the graphs.

Referring initially to FIG. 1, the force at break of a resin is a measure of the melt strength of the foam. An increase in melt strength means that it is possible to expand the foam to a higher degree, but also means that the foam tends to be closed cell rather than open cell. Traditionally, the problem with adding LLDPE to LDPE is that ineffective open-celled foams are produced.

There is, however, also an upper limit to the melt strength of a foam in that the extra gas that must be used to expand such a foam will cool the polymer mix more quickly. Thus, the foam needs to be expanded more rapidly without significant resistance.

The data shown in FIG. 1 was produced by testing resin that comprises blends of different percentages of LDPE and LLDPE. Trendlines, as shown, have been formed by extrapolating the data points using a second order polynomial.

As shown in FIG. 1, the force at break for a 0% LLDPE resin (i.e., 100% LDPE resin) is significantly greater, being around six times greater, than the force at break for a 100% LLDPE resin. This is why foams containing large amounts of LLDPE have been previously found to be ineffective, and is one of the reasons why one would expect the melt strength of a blend of LLDPE and LDPE to be lower than the melt strength of a foam that consists only of LDPE.

The lower melt strength of conventional LLDPE is thought to be due to its lack of long chain branches, which provides an insufficient melt strength to allow successful foam formation. Thus, previous attempts to improve the melt strength of LLDPE foam have focused on using, for example, metallocene-catalyzed LLDPE, which has greater homogeneity and a greater number of long-chain branches, or increasing the long branching using cross-linking agents, as outlined earlier.

However, as is also shown in FIG. 1, surprisingly, the force at break of a resin that consists of a blend of LLDPE and LDPE can actually be greater than the force at break of either 100% LDPE or 100% LLDPE. This implies that such a blend, although more difficult to foam, could actually produce a less dense foam, since it is possible to retain a larger volume of blowing agent in the foam without the bubbles breaking. Thus, the measures used in previous attempts may not actually be necessary.

The greater strength, in the film at least, seems to be produced in blends that contain between approximately 1% LLDPE and approximately 85% LLDPE. The greatest strength resin seems to be produced at around 40% LLDPE, depending on the type of LDPE and LLDPE used.

FIG. 2 can be seen to follow the same general trend as FIG. 1. The velocity at break can be considered to be indicative of the resilience of the resin, and is equivalent to the drawability of the resin. LLDPE, having more linear molecular chains, might be thought to have a higher velocity at break. This, however, may be offset by the increased force required to break the chain entanglement in the LDPE, compared to the relatively non-entangled LLDPE. Thus, depending on the characteristics of the specific blend used, either the LDPE (as in blends A and B) or the LLDPE (as in blend C) may have a higher velocity at break.

Whichever is higher, one would expect the transition between the two to be relatively linear for different percentages of the two plastics. Surprisingly, however, adding LLDPE to LDPE seems to produce an increase in velocity at break that goes beyond the higher velocity at break of the other component, implying a synergistic effect. This is particularly noticeable between around 30% of LLDPE and around 70% of LLDPE, in resin form.

FIG. 3 shows how the force of the different blends, and the different proportions of the different blends, varies at different velocities or pull-off speeds. As shown, the blended versions all require a greater force to achieve any given velocity or pull-off speed than either 100% LDPE or 100% LLDPE. Again, therefore, surprisingly, a combination of LDPE and LLDPE has better properties than either of the two plastics alone. A blend of 80% LDPE and 20% LLDPE seems to have particularly good qualities in these resins.

Figure 4:
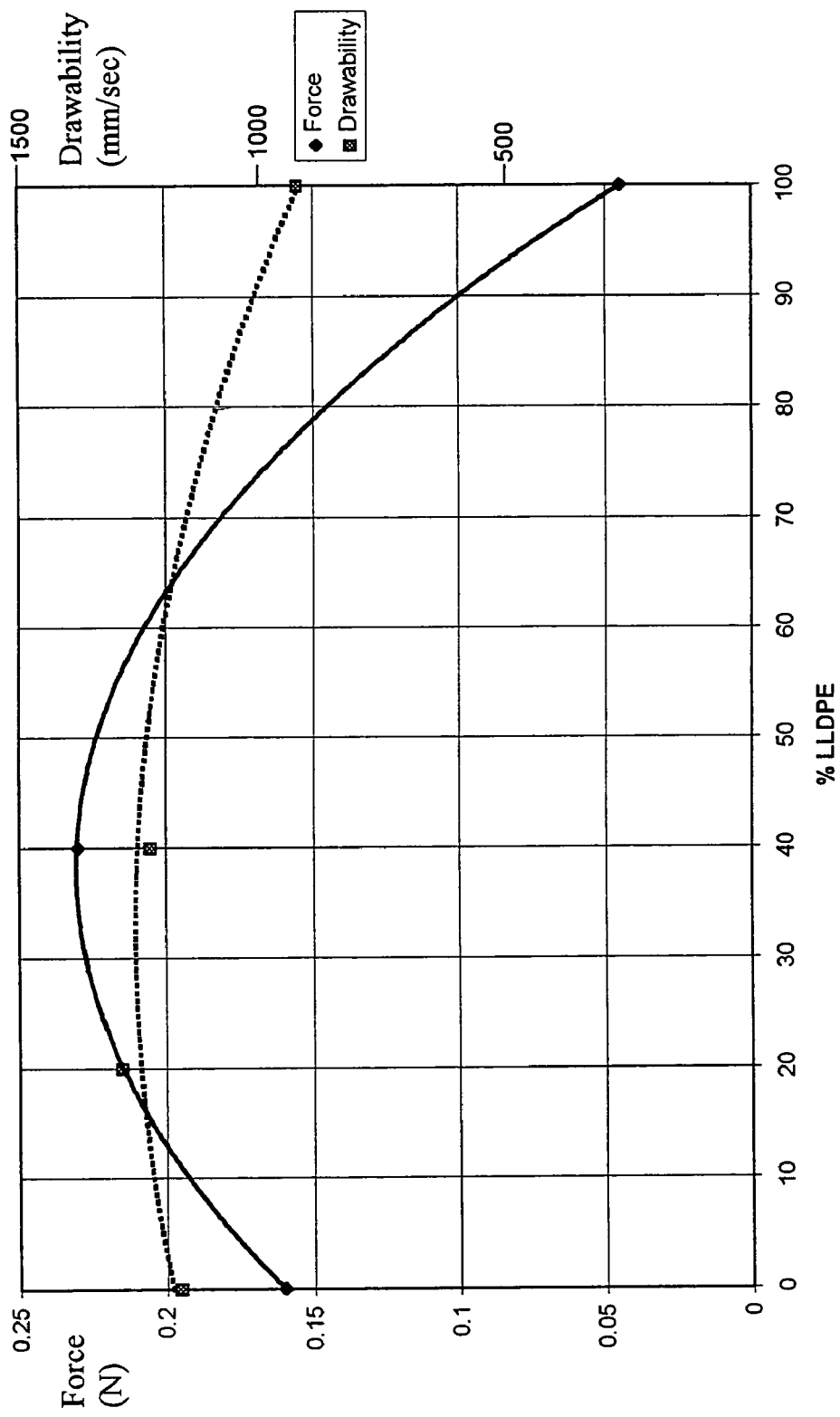
FIG. 4 is a graph that shows schematically how force and drawability vary with different blends of LLDPE and LDPE resin.

FIG. 4 also shows the synergistic effect for force to break and velocity to break (or drawability) of the resin.

Following these experiments with resin, a further set of experiments were conducted by the applicant with foam. These experiments were conducted using LDPE having a melt flow rate ("MFR") of 2 g/10 minutes and a density of 923 kg/m$^3$, and conventional Ziegler-Natta LLDPE having an MFR of 2.7 g/10 minutes and a density of 918 kg/m$^3$.

To manufacture the foam, the LLDPE was mixed with the LDPE and extruded using a single-screw or a twin-screw extruder. The blowing agent used was butane.

The experiments are described in more detail below, but some of the results showed that under the same processing conditions (that is: blowing agent weight, total feed rate, and line speed), there was no substantial foam density increase when certain quantities of LLDPE were added to the LDPE.

In fact, surprisingly, at a higher percentage addition of LLDPE, the foam density was reduced to slightly below the same level as for 100% LDPE. In these experiments, the optimum seems to be from about 20% to about 25% LLDPE addition. Since LLDPE is currently only 92.5% of the cost of LDPE, this means a cost saving of 1.5% to 1.9%, and a further benefit is the improved toughness and elasticity of foams having LLDPE added.

Another interesting point may be noted. Materials having a lower melt flow index ("MFI") are generally more difficult to foam to a good quality, since greater sheer force tends to be generated during the extrusion process. Using this method, however, it was possible to produce a good quality foam using a LLDPE resin having a low melt flow index, less than 10 g/10 minutes, preferably less than 5 g/10 minutes, and more preferably less than 3 g/10 minutes. One specific example of an LLDPE resin is 2.8 g/10 minutes.

No foam collapse was observed at higher LLDPE levels (up to 25%) in these runs, and the foam that was produced seemed to be of a similar level of effectiveness to that made using 100% LDPE.

Four different examples of the experiments made will now be described, purely to illustrate the invention. One of these used a single-screw extruder and three of these used a twin-screw extruder.

Example 1

TABLE 1

| Run No. | LDPE wt % | LLDPE | Foam density kg/m³ | Thickness mm | Foam quality | Melt temp. ° C. |
|---|---|---|---|---|---|---|
| 1 | 100 | 0 | 21.1 | 1.0 | good | 96–97 |
| 2 | 75 | 25 | 21.4 | 1.1 | good | 97 |
| 3 | 65 | 35 | 21.2 | 1.1 | good | 97 | percentages of LDPE and LLDPE are expressed as weight percentages of the total polyolefin blend
LDPE with a MFI of 2.0 g/10 min and a density of 924 kg/m³
LLDPE with a MFI of 2.8 g/10 min and a density of 919 kg/m³
blowing agent was isobutane For the first set of these experiments a 120 mm single-screw extruder was used to manufacture a foam sheet. The first one run was used as a control run, using 100% LDPE.

In the second and third runs of Table 1, with 25% and 35% LLDPE respectively, the foam quality and density obtained were comparable to that of the foam obtained using 100% LDPE, although it was necessary to adjust the process conditions to control the melt temperature.

Example 2

TABLE 2

| Run No. | LDPE wt % | LLDPE wt % | Foam density kg/m³ | thickness mm | Foam quality | Melt. Temp. ° C. |
|---|---|---|---|---|---|---|
| 1 | 100 | 0 | 24.2 | 0.8 | good | 111 |
| 2 | 90.5 | 9.5 | 24.9 | 0.8 | good | 112 |
| 3 | 87.1 | 12.9 | 24.5 | 0.8 | good | 112 |
| 4 | 83.8 | 16.2 | 24.3 | 0.8 | good | 112 |
| 5 | 80.5 | 19.5 | 24.1 | 0.8 | good | 112 |
| 6 | 74.8 | 25.2 | 24.1 | 0.8 | good | 112 | percentages of LDPE and LLDPE are expressed as weight percentages of the total polyolefin blend
LDPE with a MFI of 2.0 g/10 min and a density of 924 kg/m³
LLDPE with a MFI of 2.8 g/10 min and a density of 918 kg/m³
blowing agent was an iso-/n-butane mixture Table 2 shows the results obtained from an experiment with twin-screw extruders. The twin-screw extruder was 150 mm in diameter and was used for producing a 0.8 mm sheet of foam from a blend of LDPE and LLDPE. The blowing agent used was an iso-/n-butane mixture.

Again, the first run was used as a control run using 100% LDPE. In runs 2 through 6, the amount of LDPE was steadily reduced and the amount of LLDPE was steadily increased. Table 2 shows that foam density actually decreased for 19.5% and 25.2% LLDPE, runs 5 and 6 respectively. The foam quality was good for all blends and it was not necessary to adjust the process conditions to control the melt temperature.

Example 3

TABLE 3

| Run No. | LDPE Wt % | LLDPE Wt % | Foam density kg/m³ | thickness mm | Foam quality | Melt. Temp. ° C. |
|---|---|---|---|---|---|---|
| 1 | 100 | 0 | 22.7 | 0.8 | good | 108 |
| 2 | 95 | 5 | 22.9 | 0.8 | good | 109 |
| 3 | 85 | 15 | 22.7 | 0.8 | slight collapse | 111–112 |
| 4 | 80 | 20 | 22.9 | 0.8 | slight collapse | 111–112 |
| 5 | 75 | 25 | 22.9 | 0.8 | slight collapse | 111–112 |
| 6 | 70 | 30 | 22.7 | 0.8 | good | 109–110 | percentages of LDPE and LLDPE are expressed as weight percentages of the total polyolefin blend
LDPE with a MFI of 2.0 g/10 min and a density of 924 kg/m³
LLDPE; has a MFI of 2.8 g/10 min and a density of 919 kg/m³
blowing agent was isobutane In this experiment, a 150 mm twin-screw extruder was used for producing a 0.8 mm sheet of foam from an LDPE and LLDPE blend. Run 1 of Table 1 was used as a control run with 100% LDPE. Runs 2 to 6 show the effects of steadily increasing the percentage of LLDPE. When the LLDPE was increased to 15% (run 3) through to 25% (run 5) the melt temperature became higher and foam quality degraded. Before run 6, changes in process conditions were made that brought the melt temperature down and consequently the foam quality was again fully comparable to the control value. As with Example 1, it was necessary to adjust the process conditions to control the melt temperature.

With the addition of 30% LLDPE, it can be noted that a foam quality and density was achieved that is fully comparable to the 100% LDPE formulation.

Example 4

TABLE 4

| Run No. | LDPE Wt % | LLDPE Wt % | Foam density kg/m³ | thickness mm | Foam quality | Melt. Temp. ° C. |
|---|---|---|---|---|---|---|
| 1 | 100 | 0 | 17.4 | 3.0 | good | 107 |
| 2 | 90 | 10 | 17.6 | 3.0 | good | 107–108 |
| 3 | 85 | 15 | 17.4 | 3.0 | good | 108 |
| 4 | 80 | 20 | 17.4 | 3.1 | good | 109 |
| 5 | 75 | 25 | 17.4 | 3.1 | good | 109 |
| 6 | 65 | 35 | 17.2 | 3.1 | good | 109 |
| 7 | 55 | 45 | 17.4 | 3.0 | fair | 110–111 |
| 8 | 45 | 55 | 17.0 | 3.2 | good | 108–109 | percentages of LDPE and LLDPE are expressed as weight percentages of the total polyolefin blend
LDPE with a MFI of 2.0 g/10 min and a density of 923 kg/m³
LLDPE with a MFI of 2.8 g/10 min and a density of 919 kg/m³
blowing agent was isobutane The data shown in Table 4 are the results from a further experiment using a twin-screw extruder having a 150 mm diameter. In this example, an extruder was used to produce a 3 mm sheet of foam from a blend of LDPE and LLDPE. As can be seen from the table, the melt temperatures for the LDPE/LLDPE blends in runs 2–6 were only slightly higher than the melt temperature for the controlled run (run 1). Thus, there was no need to change the process conditions and the foam quality remained good, in that no collapse or significant density increase was observed. In run 7, the temperature was raised by 4° C. and the foam quality degraded. The process conditions, specifically the temperature on the output of the extruder, were altered and, in run 8 the melt temperature remained fairly low and the foam quality was again fully comparable to that of the controlled run, the foam density actually being lower.

In all of these runs, by adding LLDPE to LDPE, and where appropriate, by controlling the melt temperature, a foam quality and density was achieved which is fully comparable or even better, than that achievable using 100% LDPE.

When it is appropriate to control the process conditions, there are many parameters that can be altered. In these runs, the output temperature of the extruder was set by adjusting the amount of water flowing to the heat exchanger on the output. Another way of doing this is to adjust the temperature set point of the electrical heating element on the output. It is also possible to control the shear heat generated by the mechanical action of the extruder by, for example, adjusting the throughput, and other methods of controlling the melt temperature will readily occur to the skilled person.

Surprisingly, no significant increase in weight was found in these experiments for foams derived from a blend of LDPE and LLDPE, even at low levels of LLDPE. In fact, it was found to be possible to extrude foams containing up to 35% LLDPE on the single-screw extruder, and foams containing up to 55% LLDPE on the twin-screw extruder. Such foams would represent a significant cost saving compared to 100% LDPE foams, or foams produced using metallocene-catalyzed LLDPE, or having cross-linking agents added.

As an alternative to using LDPE, it is possible to use other polyolefins, such as polypropylene, particularly a high-melt strength polypropylene. Non cross-linked resins, or resins with a relatively small amount of cross-linking, are particularly suitable.

In the present specification, "comprises" means "includes or consists of" and "comprising" means "including or consisting of"

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A non-crosslinked polyolefin foam comprising a plastics component and a blowing agent, the plastics component comprising a first constituent and a second constituent, wherein the first constituent is a Ziegler-Natta catalyzed linear low density polyolefin and the second constituent is a low density polyolefin, the Ziegler-Natta catalyzed linear low density polyolefin has a polydispersity of less than 10 and a melt flow index less than 10 g/10 minutes, and the foam has a density substantially the same as a foam made with 100% low density polyolefin under the same foaming conditions.

2. The polyolefin foam of claim 1, wherein the second constituent is a low density polyethylene.

3. The polyolefin foam of claim 1, wherein the plastics component comprises from 1% to 85% by weight of the first constituent, and from 99% to 15% by weight of the second constituent.

4. The polyolefin foam of claim 3, wherein the plastics component comprises from 5% to 10% by weight of the first constituent, and from 95% to 90% by weight of the second constituent.

5. The polyolefin foam of claim 3, wherein the plastics component comprises from 10% to 15% by weight of the first constituent, and from 90% to 85% by weight of the second constituent.

6. The polyolefin foam of claim 3, wherein the plastics component comprises primarily of from 15% to 20% by weight of the first constituent, and from 85% to 80% by weight of the second constituent.

7. The polyolefin foam of claim 3, wherein the plastics component comprises primarily of from 20% to 25% by weight of the first constituent, and from 80% to 75% by weight of the second constituent.

8. The polyolefin foam of claim 3, wherein the plastics component comprises primarily of from 25% to 30% by weight of the first constituent, and from 75% to 70% by weight of the second constituent.

9. The polyolefin foam of claim 3, wherein the plastics component comprises primarily of from 30% to 35% by weight of the first constituent, and from 70% to 65% by weight of the second constituent.

10. The polyolefin foam of claim 3, wherein the plastics component comprises primarily of from 35% to 40% by weight of the first constituent, and from 65% to 60% by weight of the second constituent.

11. The polyolefin foam of claim 1, wherein the foam has a density less than 90 $kg/m^3$.

12. The polyolefin foam of claim 11, wherein the foam has a density less than 30 $kg/m^3$.

13. The polyolefin foam of claim 1, wherein the polyolefin foam is a closed-cell foam.

14. The polyolefin foam of claim 1, wherein the density of the first constituent is from 917 to 930 $kg/m^3$.

15. The polyolefin foam of claim 1, wherein the crystallization temperatures of the two constituents differ by more than 8° C.

16. The polyolefin foam of claim 15, wherein the crystallization temperatures differ by more than 12° C.

17. The polyolefin foam of claim 1, wherein the melt flow index of the Ziegler-Natta catalyzed linear low density polyolefin is less than 5 g/10 minutes.

18. The polyolefin foam of claim 1, wherein the melt flow index of the Ziegler-Natta catalyzed linear low density polyolefin is less than 3 g/10 minutes.

19. The polyolefin foam of claim 1, wherein the polydispersity of the Ziegler-Natta catalyzed linear low density polyolefin is less than 8.

20. The polyolefin foam of claim 19, wherein the polydispersity of the Ziegler-Natta catalyzed linear low density polyolefin is less than 5.

21. The polyolefin foam of claim 1 further including nucleating agents and aging agents.

22. The polyolefin foam of claim 1, wherein the foam has a thickness of at least about 0.8 mm.

23. The polyolefin foam of claim 1, wherein the first and second constituents each have a different density.

24. The polyolefin foam of claim 1, wherein the first and second constituents each have a different melt flow index.

25. The polyolefin foam of claim 23, wherein the first and second constituents also have a different melt flow index.

26. A non-crosslinked polyolefin foam comprising a plastics component and a blowing agent, the plastics component comprising a first constituent and a second constituent, wherein the first constituent is a Ziegler-Natta catalyzed linear low density polyethylene and the second constituent is a polypropylene, the Ziegler-Natta catalyzed linear low density polyethylene has a polydispersity of less than 10 and a melt flow index less than 10 g/10 minutes, and the foam has a density substantially the same as a foam made with 100% polypropylene under the same foaming conditions.

27. The polyolefin foam of claim 26, wherein the second constituent is a high-melt strength polypropylene.

28. The polyolefin foam of claim 26, wherein the foam has a thickness of at least about 0.8 mm.

29. The polyolefin foam of claim 26, wherein the first and second constituents each have a different density.

30. The polyolefin foam of claim 26, wherein the first and second constituents each have a different melt flow index.

31. The polyolefin foam of claim 29, wherein the first and second constituents also have a different melt flow index.

32. A method of manufacturing a non-crosslinked polyolefin foam comprising mixing a resin comprising a first constituent and a second constituent in an extruder, adding a blowing agent to the resulting mixture, and extruding the resulting mix into foam form, wherein the first constituent is a Ziegler-Natta catalyzed linear low density polyolefin and the second constituent is a low density polyolefin, the Ziegler-Natta catalyzed linear low density polyolefin has a polydispersity of less than 10 and a melt flow index less than 10 g/10 minutes, and the foam has a density substantially the same as a foam made with 100% low density polyolefin under the same foaming conditions.

33. The method of claim 32, wherein the second constituent is a low density polyethylene.

34. The method of claim 32, wherein the first constituent is present in an amount from 1% to 85% by weight of the total polyolefin content.

35. The method of claim 34, wherein the first constituent is present in an amount from 5% to 10% by weight of the total polyolefin content.

36. The method of claim 32, wherein the first constituent is present in an amount from 10% to 15% by weight of the total polyolefin content.

37. The method of claim 32, wherein the first constituent is present in an amount from 15% to 20% by weight of the total polyolefin content.

38. The method of claim 32, wherein the first constituent is present in an amount from 20% to 25% by weight of the total polyolefin content.

39. The method of claim 32, wherein the first constituent is present in an amount from 25% to 30% by weight of the total polyolefin content.

40. The method of claim 32, wherein the first constituent is present in an amount from 30% to 35% by weight of the total polyolefin content.

41. The method of claim 32, wherein the first constituent is present in an amount from 35% to 40% by weight of the total polyolefin content.

42. The method of claim 32, wherein the foam is extruded to a density of less than 90 kg/m$^3$.

43. The method of claim 32, wherein the foam is a closed-cell foam.

44. The method of claim 32, wherein the density of the first constituent is from 917 to 930 kg/m$^3$.

45. The method of claim 32, wherein the crystallization temperatures of the first and second constituents differ by more than 8° C.

46. The method of claim 45, wherein the crystallization temperatures of the first and second constituents differ by more than 12° C.

47. The method of claim 32, wherein the first constituent has a melt flow index of less than 5 g/10 minutes.

48. The method of claim 47, wherein the first constituent has a melt flow index of less than 3 g/10 minutes.

49. The method of claim 32, wherein the polydispersity of the Ziegler-Natta catalyzed linear low density polyolefin is less than 8.

50. The method of claim 49, wherein the polydispersity of the Ziegler-Natta catalyzed linear low density polyolefin is less than 5.

51. The method of claim 32, further including mixing nucleating agents and aging agents with the first and second constituents.

52. The method of claim 32, wherein the resultant mixture is extruded in a twin-screw extruder.

53. The method of claim 32 further including controlling the melt temperature of the mix during extruding.

54. The method of claim 53, wherein controlling the melt temperature includes matching the melt temperature of the mix to a pre-determined datum.

55. The method of claim 54, wherein the pre-determined datum is determined by extruding 100% of the second constituent.

56. The foam produced according to the method of claim 32.

57. The foam produced according to the method of claim 32, wherein the foam has a thickness of at least about 0.8 mm.

58. The foam produced according to the method of claim 32, wherein the first and second constituents each have a different density.

59. The foam produced according to the method of claim 32, wherein the first and second constituents each have a different melt flow index.

60. The foam produced according to the method of claim 58, wherein the first and second constituents also have a different melt flow index.

61. A method of manufacturing a non-crosslinked polyolefin foam comprising mixing a resin comprising a first constituent and a second constituent in an extruder, adding a blowing agent to the resulting mixture, and extruding the resultant mix into foam form, wherein the first constituent is a Ziegler-Natta catalyzed linear low density polyethylene and the second constituent is a polypropylene, the Ziegler-Natta catalyzed linear low density polyethylene has a polydispersity of less than 10 and a melt flow index less than 10 g/10 minutes, and the foam has a density substantially the same as a foam made with 100% polypropylene under the same foaming conditions.

62. The method of claim 61, wherein the second constituent is a high-melt strength polypropylene.

63. The foam produced according to the method of claim 61, wherein the foam has a thickness of at least about 0.8 mm.

64. The foam produced according to the method of claim 61, wherein the first and second constituents each have a different density.

65. The foam produced according to the method of claim 61, wherein the first and second constituents each have a different melt flow index.

66. The foam produced according to the method of claim 64, wherein the first and second constituents also have a different melt flow index.

* * * * *